(12) United States Patent
Makela

(10) Patent No.: US 9,500,079 B2
(45) Date of Patent: Nov. 22, 2016

(54) METHOD AND CONTROL SYSTEM FOR A MINING VEHICLE AND A MINING VEHICLE

(71) Applicant: SANDVIK MINING AND CONSTRUCTION OY, Tampere (FI)

(72) Inventor: Mikko Makela, Tampere (FI)

(73) Assignee: SANDVIK MINING & CONSTRUCTION OY, Tampere (FI)

( * ) Notice: Subject to any disclaimer, the term of this patent is extended or adjusted under 35 U.S.C. 154(b) by 0 days.

(21) Appl. No.: 14/894,394

(22) PCT Filed: May 27, 2013

(86) PCT No.: PCT/EP2013/060857
§ 371 (c)(1),
(2) Date: Nov. 27, 2015

(87) PCT Pub. No.: WO2014/191013
PCT Pub. Date: Dec. 4, 2014

(65) Prior Publication Data
US 2016/0123146 A1  May 5, 2016

(51) Int. Cl.
*E21D 20/00* (2006.01)
*G05D 1/02* (2006.01)
*E21B 3/00* (2006.01)
*E21B 7/02* (2006.01)

(52) U.S. Cl.
CPC ............ *E21D 20/003* (2013.01); *E21B 7/023* (2013.01); *E21C 1/00* (2013.01); *G05D 1/024* (2013.01); *G05D 2201/021* (2013.01)

(58) Field of Classification Search
CPC . E21D 20/003; E21B 7/023; B60K 31/0008; E02F 9/26
See application file for complete search history.

(56) References Cited

U.S. PATENT DOCUMENTS

| | | | | |
|---|---|---|---|---|
| 4,434,864 A | * | 3/1984 | Lupo | B60B 3/041 152/310 |
| 4,470,635 A | * | 9/1984 | Paurat | E21D 9/102 173/4 |
| 5,375,059 A | * | 12/1994 | Kyrtsos | B60K 31/0008 342/357.24 |
| 5,390,125 A | * | 2/1995 | Sennott | B60K 31/0008 342/357.24 |
| 5,407,252 A | * | 4/1995 | Perero | E21C 27/01 15/93.1 |
| 5,438,517 A | * | 8/1995 | Sennott | B60K 31/0008 342/357.24 |
| 5,555,503 A | * | 9/1996 | Kyrtsos | G08G 1/202 342/357.24 |
| 5,794,721 A | * | 8/1998 | Clonch | E21D 20/003 175/170 |
| 6,728,619 B2 | * | 4/2004 | Adachi | E02F 9/26 342/357.75 |
| 2011/0123135 A1 | * | 5/2011 | Hsieh | G06K 9/00201 382/285 |
| 2016/0123146 A1 | * | 5/2016 | Makela | G05D 1/024 701/50 |
| 2016/0252909 A1 | * | 9/2016 | Webber | G05D 1/0278 |

FOREIGN PATENT DOCUMENTS

WO  2004086084 A1  10/2004
WO  2010149857 A1  12/2010

* cited by examiner

Primary Examiner — McDieunel Marc
(74) Attorney, Agent, or Firm — Corinne R. Gorski

(57) ABSTRACT

A mining vehicle including a movable carrier, at least one boom having a plurality of boom joints, several boom actuators for moving the boom in different positions, at least one mining work device being arranged at a distal portion of the boom, and at least one control unit for controlling the position of at least one of the boom and the mining work device. The mining vehicle further including observing device for obtaining information indicative of a position of at least one of the boom and the mining work device in which collision to an obstacle can be avoided. The control unit is configured to control the position of at least one of the boom and the mining work device in response to the obtained information to avoid hitting the obstacle when the mining vehicle moves.

19 Claims, 3 Drawing Sheets

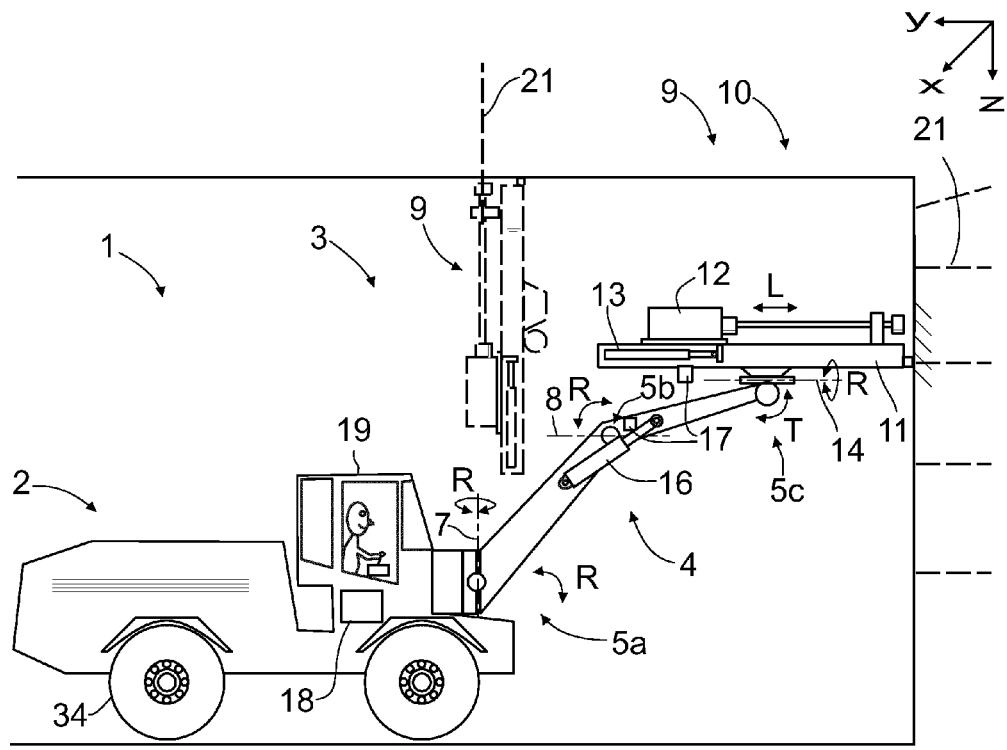
FIG. 1
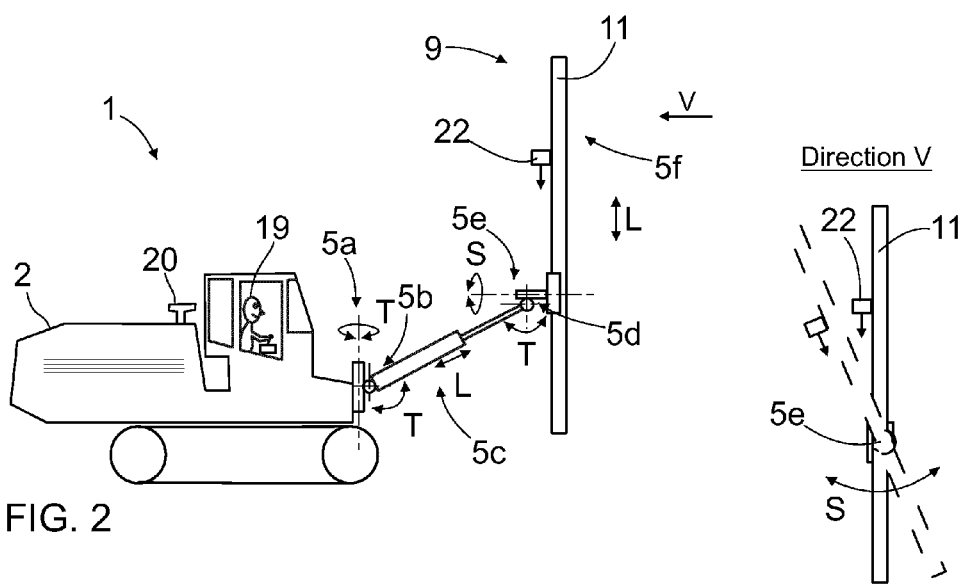
FIG. 2
FIG. 3

METHOD AND CONTROL SYSTEM FOR A MINING VEHICLE AND A MINING VEHICLE

RELATED APPLICATION DATA

This application is a §371 National Stage Application of PCT International Application No. PCT/EP2013/060857 filed May 27, 2013.

FIELD OF THE INVENTION

The invention relates to a mining vehicle, and particularly to a system for controlling movement of the mining vehicle. The invention further relates to a method of controlling movement of a mining vehicle and to a computer program for executing control for controlling movement of a mining vehicle.

BACKGROUND OF THE INVENTION

In mines and other work sites, various mining vehicles, i.e. mobile mining machines, are used. The mining vehicle is provided with a boom and a mining work machine on the boom. The boom is moved during use between different working positions. The boom may also have a transport position, wherein when the boom is moved to the transport position the mining vehicle may be moved in the site to another location. Especially in narrow tunnels e.g. in mines and some other kinds of sites the space for moving the mining vehicle may be limited wherein there may be a risk that the boom may hit a wall of the mine or another obstacle during moving the mining vehicle. In some situations the mining vehicle may not be able to go around a corner without moving the boom or booms to a different position. Hence, to avoid damages to the boom the operator of the mining vehicle need to observe the space usable for moving the mining vehicle and if the boom is about to hit an obstacle, the operator may need to stop the mining vehicle and move the boom or parts of it to another position so that the mining vehicle is able to continue moving without hitting the obstacle. Controlling the boom is a demanding and time consuming task, because the boom structure is complex. In some situations the operator may not be able to control the boom from the same seat which the operator may be using when driving the vehicle. Hence, the operator needs to stop the mining vehicle, activate a parking brake, and move her/himself inside the mining vehicle into another location before s/he is able to change the position of the boom.

Some mining vehicles may comprise a front frame which is also movable in relation to the mining vehicle. The front frame, which may also be called as a boom in this application, may be equipped with one or more mining tools. The boom and the front frame may also be called as a support for a mining tool or a support for a mining work device.

SUMMARY OF THE INVENTION

An object of the invention is to provide a novel and improved mining vehicle and a method for controlling movements of the mining vehicle and/or parts of the mining vehicle when the mining vehicle is moved and the space for the moving the vehicle is limited. In some embodiments there is provided a method and a control system for automatically moving a boom of the mining vehicle when the mining vehicle is moved and the space for the moving the vehicle is limited. The mining vehicle according to the invention is characterized in that the mining vehicle further comprises observing means for obtaining information indicative of a position of at least one of the boom and the mining work device in which collision to an obstacle can be avoided, wherein the control unit is further configured to control the position of at least one of the boom and the mining work device in response to the obtained information to avoid hitting the obstacle when the mining vehicle moves. The method according to the invention is characterized by obtaining information indicative of a position of at least one of the boom and the mining work device in which collision to an obstacle can be avoided, and controlling the position of at least one of the boom and the mining work device in response to the obtained information to avoid hitting the obstacle when the mining vehicle moves.

An idea of the disclosed solution is that information of a distance between the mining work device and/or the boom and an obstacle is obtained, and controlling the position of the mining work device and/or the boom in response to the determined distance to avoid hitting the obstacle when the mining vehicle moves. The mining vehicle comprises a control unit for controlling the boom and the mining work device. The control unit may move automatically the mining work device and/or the boom so that the mining work device and the boom can bypass an obstacle when moving the mining vehicle. In some other embodiments a control system of the mining vehicle may provide indication to the operator of the mining vehicle of possible risks for collision wherein the operator of the mining vehicle may decide how to control movements of the mining vehicle and the boom(s) and the mining work device(s) of the mining vehicle.

An advantage of the disclosed solution is that work of the operator becomes easier and less demanding.

According to an embodiment, an environment observing system may examine the space available for moving the mining vehicle so that the boom and/or the mining work device can be moved when necessary to a better position so that the boom and the mining work device do not hit walls, ceiling, floor or other obstacles of the mining site when the mining vehicle is moving.

According to an embodiment, one or more alternative transport positions of the boom are taught for the boom control system. The boom control system may select one of the alternative transport positions on the basis of information provided by the environment observing system so that the probability of hitting obstacles in the selected alternative transport position is minimized. The alternative transport positions may be taught to the system beforehand. For example, the boom can be moved under manual control in one or more desired positions as the alternative transport positions and each position can be stored in a memory medium. It is possible to store the current position of one single boom joint, positions of several selected boom joints or all joints of the boom. The teaching process is rather simple to implement. For executing this embodiment a mining vehicle comprises means for teaching one or more boom joint positions and means for storing the taught positions. Further, a control unit of the mining vehicle may be arranged to assist the teaching and storing processes.

According to an embodiment, the boom is moved from a current position towards another position as long as needed or as long as possible to avoid collision to an obstacle.

According to an embodiment, the boom and the mining work device are not in front of the mining vehicle when the mining vehicle is moved but in the back of the mining vehicle. Hence, the control system can track the travelling route of a carrier part of the mining vehicle. By using information on the travelling route and dimensions of the carrier part the control system may be able to determine an area (an opening) through which the carrier part just went and control the boom and/or the mining work device in such a way that each part of the boom and the mining work device also travels within the same opening.

According to an embodiment, a graphical presentation of a current position of the mining vehicle and the boom and/or the mining work device with respect to the environment of the mining vehicle is shown e.g. on a display of the mining vehicle or on another kind of element capable of showing visual information, wherein the operator could have better understanding how the boom would fit through a desired travelling route. In some embodiments this could be implemented by showing boom positions, mining work device positions and path the mining vehicle just went through from a bird's eye perspective.

According to an embodiment, a sensor such as a camera or a radar or a laser scanner measures actual dimensions of the environment (e.g. a tunnel) and present those and the location of the mining vehicle and the boom and the mining work device on the display.

According to an embodiment, the boom is equipped with one or more distance measuring elements so that it is possible to measure the distance from at least one of the boom and the mining work device to a wall of a tunnel or to an obstacle.

According to an embodiment, the system is provided with an alarm system which may alert the operator of the mining vehicle, if it seems that one or more of the booms or mining work devices may hit an obstacle such as a wall of a tunnel. For example, the display could show by a specific colour (e.g. red) critical parts and/or an audible alarm may be generated.

According to an embodiment, if collision is determined very likely, the speed of the mining vehicle is automatically decreased, or the mining vehicle may be stopped and/or a parking brake may be automatically applied.

According to an embodiment, the control system performs a stability check before moving the boom. The control system may determine a first alternative transport position for the boom and possibly for the mining work device, calculate a corresponding centre of mass of the mining vehicle by using stored information on the dimensions and mass of the carrier part and the boom and possibly the mining work device. If the calculated centre of mass reveals that the mining vehicle would be stable (i.e. did not stumble), the control system moves the boom and possibly the mining work device to the first alternative transport position. If, however, the calculated centre of mass reveals that the mining vehicle would become unstable (i.e. might stumble), the control system selects a second alternative transport position and repeats the step of calculating the centre of mass and determining the stability of the mining vehicle. These steps may be repeated until an alternative transport position for the boom and possibly the mining work device is found in which the mining vehicle remains stable, or if such a position cannot be found, the mining vehicle may be stopped and/or the operator may be warned that it may not be possible to go forward or that the operator needs to manually control the boom and/or the mining work device so that it will not hit obstacles.

According to an embodiment, information on a turning angle of the carrier part is obtained and used in the determination of the alternative transport position for the boom. The turning angle may be determined on the basis of the direction of turning wheels of the carrier part with respect to e.g. a longitudinal axis of the carrier part, or if the mining vehicle is an articulated vehicle, the turning angle may be determined on the basis of the angle of joint rotation between two carrier parts of the mining vehicle.

According to an embodiment, the control system may determine the path the mining vehicle should travel so that it will pass through without hitting obstacles. In other words, the control system may analyse the shape of the tunnel and the available boom positions and mining work device positions to determine in which route there is enough space for the boom and the mining work device.

According to an embodiment, a calibration procedure for the measuring means of the boom is carried out when the boom is in the transport position and supported against at least one transport support. When the boom rests against the transport support the position of the boom is accurate and stabile, whereby calibration is easy to execute.

According to an embodiment, the predetermined positions of the boom joints are stored as measuring values in a memory medium. The predetermined positions can be taught for the boom control system by moving the boom manually and gathering the measuring values from sensors, measuring devices and corresponding measuring means. When moving the boom to the predetermined position, the boom control system uses the stored measuring values. An advantage of the use of the stored measuring values is that possible calibration inaccuracies of the measuring means do not affect the actual positioning accuracy of the boom. That is because the values are gathered and reproduced by the same measuring means. It is a question of relative accuracy and not absolute accuracy.

According to an embodiment, the mining vehicle is operable by remote controlling, wherein the operator is not sitting inside the mining vehicle but is operating the mining vehicle by a remote controller either near the mining vehicle or further away. The mining vehicle may comprise at least one camera for providing visual information around the mining vehicle. The mining vehicle may also comprise communication means to send the camera information and other information to the user so that the user can control the moving of the mining vehicle, the boom of the mining vehicle, the mining work device and other operations of the mining vehicle. The communication means can also be used to send information on the situation of the boom and possibly the mining work device with respect to walls of a tunnel and to other obstacles. For example, if the control unit of the mining vehicle detects that the space needed to move the mining vehicle may not be sufficient, a warning message may be sent to the remote controller of the user.

According to an embodiment, the mining work device is provided with one or more inclinometers for measuring orientation e.g. with respect to gravity and/or with respect to a surface the mining vehicle is travelling. It is rather simple to fasten the inclinometer to a side surface of a feed beam, for example. The mining work device, such as a rock drilling unit, may have a substantially vertical operational position and a substantially horizontal transport position. The control unit receives measuring data from the inclinometer and utilizes the measuring data when moving the boom and/or the mining work device. The control unit may also utilize the measuring data when moving the boom and/or possibly the mining work device during movement of the mining vehicle e.g. to determine the centre of mass of the mining vehicle and to avoid the mining vehicle becoming unstable.

According to an embodiment, the control unit is configured to process position data as coordinates in a coordinate system of the mining vehicle.

According to an embodiment, the control unit is configured to process position data as coordinates in a coordinate system which is external to the mining vehicle.

According to an embodiment, the control unit is configured to process position data as coordinates in a global coordinate system.

According to an embodiment, the control unit is configured to process position data as boom joint values.

According to an embodiment, the control system includes a collision avoidance system for ensuring that the boom or the mining work device on the boom does not hit the ground, a control cabin, the carrier, another boom or mining work device, or any physical obstacle belonging to the mining vehicle. Dimensions and kinematics of the mining vehicle can be determined for the control unit and measuring data concerning the position of the boom and/or the mining work device can be fed from measuring sensors or devices to the control unit. The control unit may determine the position of the boom and the mining work device and may compare the positions to the obstacle data. The control unit may control the movements of the boom joints taking into account the collision analysis. The control unit may move the boom joints in such an order that the boom parts and the mining work device pass the known obstacles. Thus the boom may have one or more intermediate positions through which it is moved to the desired final position. Alternatively or additionally, the control unit may move a feed beam of the mining work device and/or some other parts of the mining work device in such an order that the boom parts and the mining work device pass the known obstacles.

Thus, also the mining work device may have one or more intermediate positions through which it is moved to the desired final position.

According to an embodiment, the control unit is arranged to monitor a transfer drive of the mining vehicle and to indicate to the operator if the boom is not in a transport position when the operator begins to move the carrier. Alternatively, the control unit may prevent the transfer drive until the boom is moved to the transport position. Although the boom were moved to the transport position when beginning to move the carrier, the control system is still able to move the boom during the movement of the carrier when obstacles need to be avoided.

According to an embodiment, the disclosed boom control system and procedure is intended for an underground mining vehicle which is designed for drilling in underground production mines, tunnel work sites and when creating different rock cavities and storage halls.

According to an embodiment, the disclosed automatic boom and/or mining work device control procedure is carried out by executing one or more software or computer program designed for the purpose. The computer program comprises program code means configured to execute the disclosed functions and steps when being run on a computer.

According to an embodiment, the mining vehicle is an underground drilling device and the work device comprises a feed beam and a drilling and/or bolting machine.

The above disclosed embodiments can be combined to form suitable solutions provided with necessary features. Let it be mentioned that in this patent application the term "mining" is interpreted widely. The term mining refers not only to conventional mines but also other work sites where rock is drilled or processed in any other way. Consequently, also road building, construction and other work sites can be considered to be mining work sites. Thereby a mining vehicle may refer to a vehicle used in construction and contract sites also.

DESCRIPTION OF THE DRAWINGS

Some embodiments are described in more detail in the accompanying drawings, in which FIG. 1 is a schematic side view showing a rock drilling rig for underground working sites, FIG. 2 is a schematic side view showing a boom system of a rock drilling rig and degrees of freedom of the boom system, FIG. 3 shows schematically and in direction V swinging of the drilling unit in lateral direction.

For the sake of clarity, the figures show some embodiments of the disclosed solution in a simplified manner. In the figures, like reference numerals identify like elements.

DETAILED DESCRIPTION OF THE INVENTION

Figure 4:
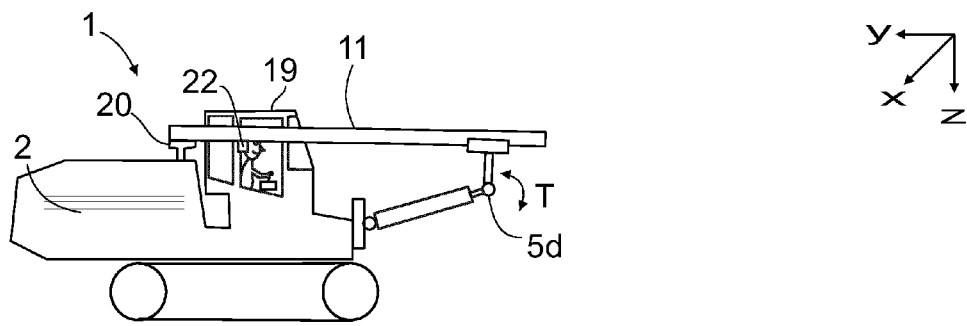
FIG. 4 shows schematically the rock drilling rig of FIG. 2 in a situation where the boom is moved to a transport position.

It should be noted that the term "mining vehicle" may generally refer to different mobile machines used in rock excavation operations in an above-ground or underground production area. The mining vehicle may be suitable for use in mines and/or constructions sites.

FIG. 1 shows an example of a mining vehicle 1, in this case a rock drilling rig, which is suitable for drilling horizontal drill holes 21 to a face of a tunnel or similar underground rock cavity. The mining vehicle 1 comprises a movable carrier 2 that can be transport driven to a working site 3. The mining vehicle 1 is provided with a boom 4 or boom system which includes several boom joints 5a-5c whereby it has versatile movements. The boom system 4 may have turning joints and may also have linear joints (not shown). The disclosed boom system 4 has totally four degrees of freedom. The boom 4 can be turned R in lateral direction relative to a vertical axis 7 of the boom joint 5a. The boom 4 can be lifted and lowered by turning R it relative to a horizontal axis 8 of the boom joint 5b. At a distal end of the boom 4 there is a mining work device 9, in this case a rock drilling unit 10 comprising a feed beam 11 and a rock drilling machine 12 supported to the feed beam 11. The rock drilling machine 12 can be moved linearly L on the feed beam 11 by means of a feed device 13. The rock drilling unit 10 can be turned T in forward and backward directions relative to a horizontal axis 14 of the boom joint 5c. This boom movement is called tilting T. The boom 4 can be moved by means of boom actuators 16, some of which are shown in FIG. 1. The boom 4 can be moved by controlling the boom actuators 16 manually under the control of the operator, or by utilizing automated boom control capable of moving the boom 4, or at least one boom joint 5a-5c, in one or more predetermined positions relative to the carrier 2.

The boom 4 is also provided with one or more sensors 17, measuring devices or other positioning detection means for determining the position of the boom system. The measuring means may be arranged on the boom or they may locate on the carrier, for example. Measuring data of the measuring means 17 is transmitted to a control unit 18 of the mining vehicle 1. The control unit 18 may determine the position of the boom 4 and may indicate it to the operator, and may also take it into account in the automatic boom control. The boom joint positions can be calculated in the control unit too.

The mining vehicle 1 may also include a control cabin 19 on the carrier 2. The control cabin 19 may be provided with suitable control members for controlling the operation of the boom 4 and the whole mining vehicle 1. The control unit 18 may be placed inside the control cabin 19. Further, the mining vehicle may have one or more transport supports (not shown in FIG. 1), against which the boom 4 can be moved before a transport drive of the carrier 2 is started. The transport support may be a physical support piece, such as a rubber pad or it may be an elongated support structure pointing upwards from the carrier 2. In some embodiments the transport support is arranged next to the control cabin 19. There is little space on the carrier 2, whereby the boom has to be moved to the transport position with accurate movement control.

In some cases, the drilling unit 10 can be turned transverse to the tunnel for drilling blasting or reinforcing holes to a ceiling and walls of the tunnel. The rock drilling rig may include several booms, whereby it may have at least one drilling boom with a drilling unit and one bolting boom with a bolting unit. Furthermore, the mining work device may also be a feed unit for feeding blasting or soldering material into the drill holes 21. The boom 4 is provided with several boom joints and it can be positioned in a versatile manner in different positions. The boom 4 can be controlled according to control principles disclosed in this patent application. The underground mining vehicle may also have predetermined transport positions for the booms.

FIG. 3 illustrates in a simplified manner boom movements of a mining vehicle 1. As can be noted, the boom 4 is slightly different to the one shown in FIG. 1. For the sake of clarity, FIG. 3 discloses the mining vehicle 1 in a simplified manner. The boom 4 has six degrees of freedom and comprises several boom joints 5*a*-5*f*. The mining work device 9 may be provided with one or more inclinometers 22 for determining its vertical position. The inclinometer 22 can produce reliable enough measuring results only when it is measuring vertical positions relative to the gravity. Let it be mentioned that, in addition to vertical positions, also inclined positions can be measured by means of inclinometers.

In FIG. 4 the boom 4 is moved to one transport position whereby the feed beam 11 rests on the transport support 20. There is no need to make accurate measuring with the inclinometer 22 when controlling the tilt T movement towards the transport support 20. In connection with other boom joints there may be sensors other than inclinometers. The boom 4 can be moved automatically to the vertical position relative to the swing joint 5*e*. There may be one or more other predetermined positions where the boom can be moved under the control of the control unit.

Figure 5:
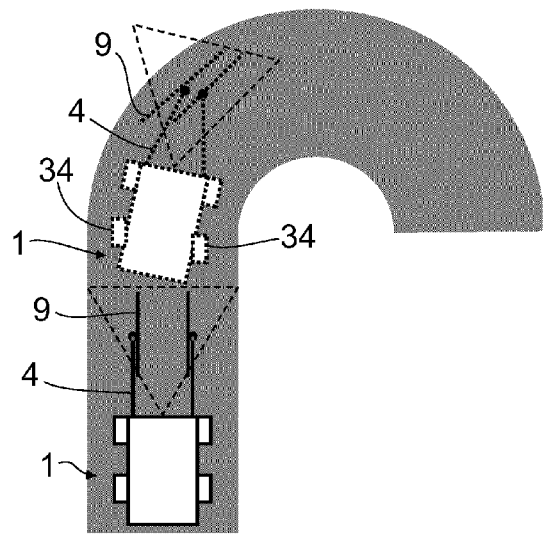
FIG. 5 is a schematic top view showing a rock drilling rig moving inside a tunnel.

When the operator starts to move the mining vehicle 1 to another place in the mining site, the mining vehicle 1 may be set to a transport position. Hence, the boom 4 may first be moved to the transport position and after that it may be possible to start moving the mining vehicle 1. The control unit 18 may start a control program which processes data received from different kinds of sensors, such as the one or more inclinometers 22, a positioning device, and/or an environment observing system 32. The control unit 18 processes the received data to determine the space between the boom 4 or a part of the boom and the walls of the tunnel or other obstacles which may be along the path the mining vehicle 1 is travelling. If the control unit 18 notices that the boom 4 may hit an obstacle, the control unit 18 forms one or more control signals to one or more boom actuators 16 to change the position of the boom 4 or parts of it in such a way that the obstacle can be avoided. In some situations it may be necessary to control the boom actuators 16 in such a way that parts of the boom 4 are moved in a certain manner. In some situations it may be sufficient to horizontally swing the rock drilling machine 12 as is illustrated in FIG. 5. In FIG. 5, two different positions of the mining vehicle are depicted with dotted lines. It can be seen that in these two positions the rock drilling machine 12 has been turned to a different angle with respect to the carrier 2 of the mining vehicle 1.

In some embodiments, the control unit 18 may also receive data from a speedometer 37 to determine the speed the mining vehicle is moving and data on a turning angle of the carrier part. These data may be used by the control unit 18 to determine a stability of the mining vehicle. If the control unit 18 determines that the measured speed and turning angle may lead to a situation that the mining vehicle becomes unstable and/or that the mining vehicle is at a risk of hitting an obstacle the control unit 18 may slow down the movement of the mining vehicle and/or decrease the turning angle.

The mining vehicle may also use information from one or more inclinometers 22 in the determination of the stability of the mining vehicle.

The environment observing system 32 may comprise a laser scanner which may detect walls of a tunnel, stones and other obstacles to be avoided. In some embodiments, the control unit may also be able to determine the current position of the mining vehicle in the tunnel or in some other location on the basis of the scanner information and a predetermined environment model or a tunnel map. In addition to or instead of the laser scanner the environment observing system 32 may comprise a distance measurement unit which may be based on e.g. an ultrasonic or an optical measurement system.

When the control unit 18 is sensing the environment of the mining vehicle, it may receive measurement data from the environment observing system 32. For example, the laser scanner may measure distances from the laser scanner to a multiple of points in the environment, preferably in front of the mining vehicle in the driving direction and possibly forward sideways from the mining vehicle. The location of the laser scanner with respect to the boom is known, wherein the measured distances are indicative of free space between the boom and obstacles in front of and forward sideways of the mining vehicle. This kind of laser scanning may also be called as a 3-dimensional laser scanning or 3-dimensional object scanning. The control unit 18 may then use the distance information together with information on the moving direction and boom position to determine if there is a risk of a collision. The control unit 18 may also use the distance information together with information on the moving direction and boom position to determine how the boom 4, the work device, and/or the mining vehicle should be moved to avoid collisions. In one embodiment, the distance of an outer end of the working device is estimated, enabling to move the boom and/or work device to avoid the work device to touch e.g. walls or ground during tramming.

The control unit 18 may also have access to an environment model such as a tunnel model or another kind of a model, which contains information on the environment in which the mining vehicle is operating. The environment model may have been stored beforehand into a memory 28 of the control system 23 of the mining vehicle. The environment model may be used in determining the current location of the mining vehicle and/or in determining limits of movements of the mining vehicle. For example, the result of the laser scanning may be compared with the environment model to find out similarities (correspondences) between the laser scanning and the environment model. If similarities exist they may reveal the current location of the mining vehicle or they may be used to check and/or correct e.g. dead reckoning based information of the position of the mining vehicle. For example, the current position may have been derived by using a previous known position and the length of travel measured by an odometer. The length of travel measurement may not be correct due to possible errors in the measurement. Hence, the derived position may be corrected by the results from the comparison process.

The environment model and the current position of the mining vehicle may also be used to determine e.g. the curvature of the tunnel in front of the mining vehicle and control the position of the boom and/or the mining work device so that collisions could be avoided when the mining vehicle moves further in the tunnel.

The mining vehicle may comprise an automatic drive controller controlling autonomous or semi-autonomous drive. The environment model, or a separate route plan, may contain predetermined route positions via which the mining vehicle should travel. Hence, the control unit 18 may utilize the determined location and the environment model to control the movements of the mining vehicle and the boom so that the mining vehicle travels via the predetermined route positions in such a way that collisions are avoided.

The control unit 18 may also control the movement of the mining vehicle in such a way that the mining vehicle travels as near the centre line of the tunnel as possible.

The steps described above may be repeated at intervals so that the risk of colliding obstacles is as small as possible.

In some situations the environment observing system 32 may detect that the mining vehicle 1, the boom 4 or a part of them are very close to a collision. Hence, the control unit 18 may stop the mining vehicle and inform the operator that it is not possible to continue without hitting the obstacle. The operator may then control the boom 4 manually or move the mining vehicle 1 a little bit backwards and select another route for the mining vehicle 1 to proceed.

Figure 6:
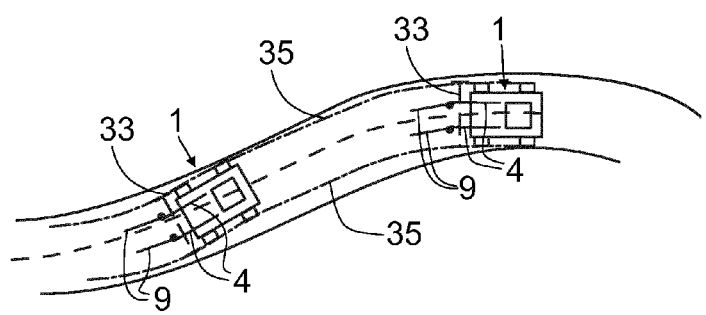
FIG. 6 is a schematic top view showing another rock drilling rig moving inside a tunnel.

Next, another embodiment is described with reference to FIG. 6. In this embodiment the boom 4 is not in front of the mining vehicle 1 but it is at the backside of the mining vehicle 1 with respect to the moving direction of the mining vehicle 1. The control unit 18 keeps track of the travelling route (path) the mining vehicle 1 is moving and controls the boom 4 in such a way that the boom 4 also moves within the area (a "window") through which the carrier 2 of the mining vehicle 1 just passed. Hence, the control unit 18 is aware of the dimensions of the carrier 2. FIG. 6 illustrates an example in which the carrier has passed the "window" 33 within which the boom 4 and the mining work device 9 should also proceed. FIG. 6 also illustrates with lines 35 the route the outermost parts of the carrier has passed. If the boom 4 and the mining work device 9 also proceeds within the "tunnel" the boom 4 and the mining work device 9 should not collapse any obstacles.

In some embodiments the control unit 18 may also receive information on a turning angle of the carrier part e.g. as an angle of the turning wheels 34 (FIG. 1) of the carrier. This information may be used to predict the route the mining vehicle 1 is about to travel if it moved forward. This information may be useful in determining how the boom 4 should be moved to avoid collisions.

In some embodiments the turning angle measurement may be replaced with or added with measuring the length of travel of two or more wheels of the mining vehicle. For example, one measurement may be based on a left turning wheel and another one measurement may be based on a right turning wheel. A temporary difference between measurement results may indicate that the mining vehicle is turning, wherein the measurement results may be used to determine the radius of the curvature and the length of travel.

The turning angle of the carrier part together with information on the speed and/or the length of travel may be used to determine the route the mining vehicle has passed. Hence, if the boom 4 is at the backside of the mining vehicle 1 it may not be necessary to use laser scanners or other distance measurement units to find out possible risks of collision if the control unit 18 controls the movements of the boom in such a way that the boom 4 stays within the "tunnel" defined by the route the outermost parts of the carrier has passed.

In some other embodiments the control system may provide indication to the operator of the mining vehicle that there is a possible risks for collision. The operator of the mining vehicle may then decide how to control movements of the mining vehicle and the boom 4. For example, the control system may suggest to change the location of the boom and/or the route of the mining vehicle and ask the operator is s/he approves the suggested operation or not. Alternatively, the control system may only provide indication to the operator how the boom and/or the mining vehicle should be moved to avoid collision, but the operator performs the actual movements.

In some embodiments it may be sufficient to avoid the boom and the mining work device hitting the surface (e.g. the ground) on which the mining vehicle is travelling. This may be performed, for example, by measuring a distance between the boom and/or the mining work device and the surface. If the distance becomes smaller than e.g. a predetermined limit, the control system may operate one or more the boom actuators and/or one or more mining work device actuators to lift upwards at least that part of the combination of the boom and the mining work device which is nearer the surface than the predetermined limit.

Although the above described example embodiments presented some principles how to avoid the boom and the mining work device hitting an obstacle, similar operations may also be applicable to avoid two or more booms and mining work devices of a multi-boom mining vehicle hitting each other. This may be achieved e.g. by using information relating to positions and angles of boom parts and mining work devices to determine if any of the boom parts and mining work devices might touch each other. If so, the control system may try to find another position for one or more of the booms or mining work devices in which they would not touch each other and still avoid collision to other obstacles. Alternatively or in addition to, the control system may use the sensors to detect possible collision risks between the booms and/or the mining work devices.

In some embodiments of the multi-boom mining vehicle there may be a table or other kind of arrangement which indicates combinations of positions or ranged of positions of booms and mining work devices and/or parts of them which are not allowed i.e. which positions may be such that the booms and/or the mining work devices may hit each other. The control system may then utilize this information when moving the booms and/or the mining work devices to avoid them hitting each other. Alternatively or in addition to, the multi-boom mining vehicle may comprise a table or other kind of arrangement which indicates combinations of positions or ranged of positions of booms and mining work devices and/or parts of them which are allowed i.e. which positions are such that the booms and/or the mining work devices will not hit each other, wherein this information may be utilized when moving the booms and/or the mining work devices to avoid them hitting each other. In other words, moving the booms and the mining work devices may be coordinated so that they do not hit each other.

In yet some embodiments of the multi-boom mining vehicle the movements of the booms and/or the mining work devices may comprise examining or evaluating the stability of the mining work vehicle to avoid possible unstable stages of the mining work vehicle. Hence, when one or more of the booms and/or the mining work devices need to be moved to another position when the mining work vehicle is moving, the movements may be performed so that unstable stages can be avoided.

It should be noted here that the term boom is also intended to cover other parts which are attached with the booms such as hydraulic conduits, hydraulic cylinders, electric wiring etc. Similarly, the term mining work device is intended to cover drill bits, drill bars etc.

The control unit 18 may also comprise a user interface program which may be used to produce visual and/or audible information to the operator of the mining vehicle 1. The control unit 18 may, for example, show the current location of the mining vehicle and inform if there is a risk of collisions if the direction of the mining vehicle were not changed. For example, critical locations might be highlighted with a special colour, e.g. as red on the display. Hence, the operator may turn the vehicle to a different direction, if possible, to avoid collision and/or the operator may manually control the boom 4.

The user interface program may also be used to visualize the operator the steepest turn the mining vehicle is able to perform wherein when the dimensions of the mining vehicle are known the operator may estimate if the mining vehicle is able to pass the intended route. If the control system comprises information on the environment the control system may then also indicate to the operator the locations in the intended route which may be difficult or even impossible to pass.

In some embodiments the visual information may be formed e.g. by a display 36, by a head-up display, by special kind of eye-classes and/or by some other suitable element.

In addition to visual and/or audible information, the control system may also provide other kinds of information to the operator. For example, haptic information may be provided e.g. by vibrating some of the input means 24 such as a joy-stick. This kind of information provision may also be called as tactile feedback.

Figure 7:
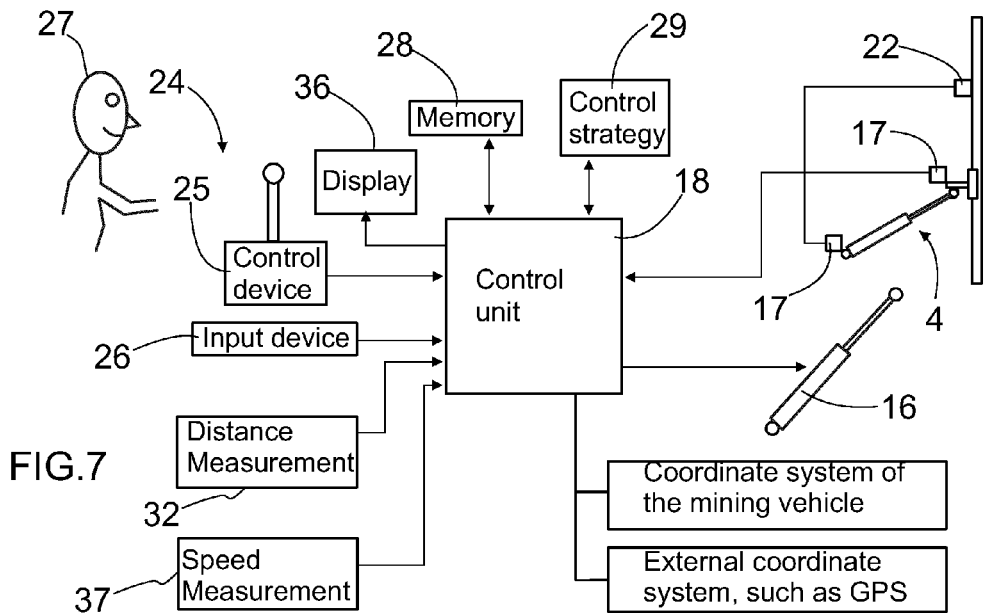
FIG. 7 illustrates a control block diagram of an apparatus for controlling the boom.

FIG. 7 shows a boom control system 23 comprising one or more control units 18 and input means 24 for feeding control data and commands to the control unit 18. The input means may include a control device 25, such as a joy-stick, and an input device 26, such as a keypad, by means of which the operator 27 may communicate with the control unit 18. Further, the control unit 18 may read data from one or more memory units 28 and also store data therein. The control unit 18 may be provided with one or more control strategies 29 including operating principles and guidelines for the boom control. The control strategy 29 may include an algorithm for automatically controlling the boom to one or more predetermined positions. Data concerning the predetermined positions may be stored in the memory unit or media 28. Measuring data is transmitted from different sensors 17, such as boom angle sensors and linear sensors to the control unit 18. Measuring data of an inclinometer 22 is also transmitted to the control unit 18. The control unit 18 may be a computer equipped with an appropriate processor capable of running a software program including a control algorithm and also processing measuring data for producing control information. On the basis of measuring data, manual control commands and the control strategy, the control unit 18 produces control commands for boom actuators 16 allowing automated boom control.

Figure 8:
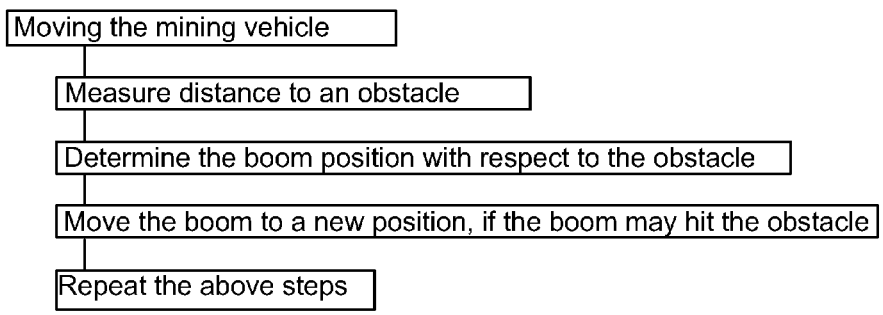
FIG. 8 is a simplified chart showing a boom control procedure in a general concept.

FIG. 8 is a simplified chart showing issues relating to the disclosed automatic boom control. The steps and features presented in this figure are discussed above and especially in section Brief description of the invention.

The drawings and the related description are only intended to illustrate the idea of the invention. The details of the invention may vary within the scope of the claims.

The invention claimed is:

1. A mining vehicle comprising:
    a movable carrier;
    at least one boom having a plurality of boom joints;
    having a plurality of boom actuators for moving the at least one boom in different positions;
    at least one mining work device arranged at a distal portion of the boom;
    at least one control unit for controlling the position of at least one of the boom and the mining work device; and
    observing means for obtaining information indicative of a position of at least one of the boom and the mining work device in which collision to an obstacle can be avoided, wherein the control unit is further configured to control the position of at least one of the boom and the mining work device in response to the obtained information to avoid hitting the obstacle when the mining vehicle moves.

2. A mining vehicle as claimed in claim 1, wherein at least two transport positions are defined for at least one of the mining work device and the boom, wherein the control unit is configured to examine in which transport position at least one of the mining work device and the boom avoids hitting the obstacle.

3. A mining vehicle as claimed in claim 1, wherein at least one of the mining work device and the boom is provided with at least one sensor for measuring orientation; the control unit is configured to utilize measuring data received from the sensor to determine a position for at least one of the mining work device and the boom in which the mining vehicle remains stable and the boom and the mining work device avoids collision to the obstacle.

4. A mining vehicle as claimed in claim 1, wherein the observing means includes means for tracking a route traveled by the mining vehicle, wherein the control unit is configured to utilize at least data regarding the route to determine a position for at least one of the mining work device and the boom in which the boom and the mining work device avoids collision to the obstacle.

5. A mining vehicle as claimed in claim 1, wherein the observing means includes means for examining environment of the mining vehicle, wherein the control unit is configured to utilize at least data regarding the environment around the route to determine a position for at least one of the mining work device and the boom in which the boom and the mining work device avoids collision to the obstacle.

6. A mining vehicle as claimed in claim 1, further comprising an environment model containing information on the environment of a mining field.

7. A mining vehicle as claimed in claim 6, further comprising means for determining the location of the mining vehicle, wherein the control unit is further configured to determine the shape of the mining field in front of the mining vehicle in the driving direction on the basis of the determined location and the environment model.

8. A mining vehicle as claimed in claim 1, wherein the observing means includes a distance measuring element for measuring a distance between the obstacle and at least one of the mining work device and the boom.

9. A mining vehicle as claimed in claim 8, wherein the distance measuring element includes at least one of a camera, a radar, and a laser scanner.

10. A mining vehicle as claimed in claim 9, wherein the control unit is further configured to use information provided by the laser scanner and the environment model to determine the location of the mining vehicle.

11. A mining vehicle as claimed in claim 1, further comprising means for presenting visual information, wherein the control unit is configured to provide visual information indicative of a route in which collision to the obstacle can be avoided.

12. A mining vehicle as claimed in claim 1, further comprising means for presenting visual information wherein the control unit (18) is configured to provide visual information to an operator of the mining vehicle indicative of the position of at least one of the boom (4) and the mining work device (9) in which collision to the obstacle can be avoided.

13. A mining vehicle as claimed in claim 12, wherein the means for presenting visual information are configured to provide visual information to an operator of the mining vehicle indicative of a part of the at least one of the boom and the mining work device in which collision to the obstacle is likely.

14. A mining vehicle as claimed in claim 1, wherein the mining vehicle is an underground drilling device and the mining work device includes a feed beam and a drilling or bolting machine.

15. A mining vehicle as claimed in claim 14, wherein the mining vehicle is configured to monitor at least one of the current position and the orientation of the feed beam, define at least one of a target position and orientation of the feed beam to avoid hitting tunnel wall or ceiling, and control at least one actuator to move the feed beam to the at least one of a target position and orientation of the feed beam.

16. A mining vehicle as claimed in claim 1, wherein the control unit is configured to process position data as boom joint values.

17. A mining vehicle as claimed in claim 1, wherein the control unit is configured to determine a path for the mining vehicle to avoid hitting obstacles by analysing the shape of the environment and available positions of the boom and the mining work device to determine in which route there is enough space for the boom and the mining work device.

18. A method of controlling a position of at least one of a boom and a mining work device of a mining vehicle while moving the mining vehicle, the method comprising:
controlling moving of the boom and the mining work device by at least one control unit including a processor;
feeding control data to the control unit; and
controlling, with the control unit, the position of at least one of the boom and the mining work device; and
obtaining information indicative of a position of at least one of the boom and the mining work device in which collision to an obstacle can be avoided, and controlling the position of at least one of the boom and the mining work device in response to the obtained information to avoid hitting the obstacle when the mining vehicle moves.

19. A computer program comprising a program code means configured to execute the method of claim 18 when run on a computer.

* * * * *